UNITED STATES PATENT OFFICE.

JOKICHI TAKAMINE, OF NEW YORK, N. Y.

DIASTATIC PRODUCT.

1,054,626.    Specification of Letters Patent.    Patented Feb. 25, 1913.

No Drawing. Original application filed February 2, 1910, Serial No. 541,617. Divided and this application filed March 10, 1910. Serial No. 548,401.

*To all whom it may concern:*

Be it known that I, JOKICHI TAKAMINE, a subject of the Emperor of Japan, and a resident of New York city, borough of Manhattan, in the county and State of New York, have invented a new and useful Diastatic Product, of which the following is a specification.

In my application filed February 2, 1910, Serial No. 541,617, I have described and claimed generically certain diastatic products and the process for producing the same, and have also claimed certain species of said products.

The object of the present application is to claim certain species not claimed, excepting generically, in said application, to wit: the new koji therein described.

Koji and moyashi are distinguished as follows: When the mycelial growth of the fungus has reached the stage prior to heading out into sporophore (or spore bearer) it has a white silky appearance and the product of that stage is koji. Moyashi is the product of a later stage when the mycelial growth has headed out into spores giving a yellowish appearance.

My present invention consists in an improvement upon the product described in my United States Patent No. 525,820. Heretofore, the product described in said patent has not gone into use commercially as a malt substitute in the brewing and alcoholic industries, because the product of said patent has never heretofore possessed a diastatic strength superior to malt. The product constituting my present invention possesses a diastatic strength when properly manufactured of from 30 to 50% in excess of malt. That is to say, as a rule it requires 3 parts by weight of kiln dried malt to convert the same weight of starch as can be converted by 2 parts by weight of my present product. Therefore, my present invention constitutes a malt substitute as an article of manufacture capable of commercial use in competition with malt.

My product is produced by the growth under certain conditions of the spores of microscopic mycelial fungi which when sown on suitable material have the property of producing diastase. I employ the genus *Aspergillus* and particularly prefer the species *Aspergillus oryzæ* of pure culture because it excels any other species with regard to production of diastase in abundance. Therefore, in the following examples of my invention, I will employ for convenience, *Aspergillus oryzæ*, but do not wish to be understood as thereby limiting myself thereto.

*Example of acclimatizing the spores.*—I take a suitable culture medium, such as wheat bran, moistened with water so as to contain from 60 to 80 (this proportion may be as low as 30 to 35 if an abundance of moisture be present in the incubator) parts by weight of water to bran. This is sterilized and, after cooling to about 30° C., an antiseptic, such as formaldehyde, is added in about the proportion of one part formaldehyde to 3000 parts of the moistened medium. A pure culture of *Aspergillus oryzæ* is introduced upon the medium and the whole is kept in an incubator at a temperature of from 28 to 30° C. which latter is the optimum temperature for the growth of *Aspergillus oryzæ*. When the growth is completed and the greenish yellow spores are produced a culture of the same is introduced upon a fresh culture medium of the same composition and containing the same proportion of formaldehyde. At least four or five generations of the growth are repeated in the same manner, employing substantially the same proportion of formaldehyde. In this manner, the spores become acclimated to that proportion of formaldehyde or substantially immune against its effects. Subsequent generations of the growth are then produced under an increase of the proportion of formaldehyde. Thus, a culture of the previously produced spores is introduced upon a fresh culture medium made as above excepting that the proportion of antiseptic is about one part of formaldehyde to 2900 parts of the moist medium. At least four or five generations of growth are produced at this proportion of antiseptic. Similar operations are repeated until the proportion of antiseptic has increased to about one part of formaldehyde to 1500 parts of the moist medium; each decrement in the proportion of moist medium being about 100 parts, and there being at least four or five generations grown at each proportion before the next succeeding change of proportion. By this gradual and step by step increase of the antiseptic, the spores become acclimatized or substantially immune to the proportion of antiseptic at each step before the next succeeding step is taken and in this way spores which, at the outset, would not have grown in the presence of a proportion of 1 to 1500 or less formaldehyde, attain the capacity of satisfactory growth under those conditions. When the maximum acclimatization has been reached it can be determined by observing that any further increase in the proportion of antiseptic prevents the growth of the fungi. Having reached the maximum acclimatization when any further increase of proportion of antiseptic would interfere with the growth of the fungus, the spores contained in the product may be separated from the culture medium preparatory to the succeeding step or otherwise. This may be done by sifting through fine sieves, after drying; the separated spores being obtained as microscopic particles of a greenish yellow color.

*Example of growth from acclimatized spores.*—The acclimatized spores obtained by the foregoing operations, either separated from the culture medium on which they were produced or otherwise, are introduced upon a new culture medium composed as before of sterilized and cooled wheat bran combined with 60 to 80 parts by weight of water and one part or less by weight of formaldehyde to 1500 parts of the moist medium, and the whole kept in an incubator at a temperature of from 28 to 30° C. (the optimum temperature for the growth of *Aspergillus oryzæ*) until the white mycelial growth is complete. If the acclimatized spores be employed separated from the old culture medium, the proportion of them to the bran in the new culture medium exclusive of water, will be as 1 to 1500. If, however, the acclimatized spores be used in conjunction with the old culture medium, this proportion will be as 1 to 200. The whole is then dried at not to exceed 40° C. When completely dry it can be kept indefinitely. The dried mass may then be powdered and sold as an article of manufacture in that condition, or before sale the spores may be separated from the culture medium by sieving and the spores sold as "pure." In either case, if produced in large quantities it constitues the new malt substitute having from 30 to 50% diastatic strength in excess of malt. It can be used in the brewing and alcoholic industries as a substitute for malt in accordance with another application about to be filed by me. It can also be used for making diastase of extraordinary strength in accordance with another application about to be filed by me. Whether the resulting product be a new moyashi (Patent 525822) or a new koji (Patent 525820) depends upon the stage at which the final culture is interrupted. At the commencement of the final culture, the temperature in the incubator will be at about 30° C. This gradually rises as the growth proceeds until it attains a temperature of 40 to 43° C. when the growth proceeds at maximum speed. At the end of about 48 hours, the culture medium will be substantially covered with a growth of white mycelial fungi of a white silky luster. If the process is stopped at this point and the product dried as before described, it is the new koji. If the process be not stopped as last described, a further growth will gradually assume, first, a yellowish and subsequently a greenish yellow appearance. After a lapse of 64 to 74 hours, more or less, from the beginning, this growth will have attained its maximum. If the product be dried at this stage, it is the new moyashi, claimed both generically and specifically in said application 541617.

The incubator is so arranged as to saturate the air with aqueous vapor to a maximum so as to keep the culture always moist; also, it should be well ventilated so as to permit the escape of carbon dioxid and supply abundance of air; also, as large a surface of the culture medium as possible should be exposed to the air. This can be done by spreading on trays to a thickness of about one to three inches. Within 12 to 16 hours, the growth starts and the temperature goes gradually up until it not infrequently reaches 42 to 43° C. It is desirable to keep the temperature as near as possible to 30° C. since too high a temperature will, for a while, slacken the growth of the fungus; but more or less higher temperature than 30° C. does not considerably affect the final result excepting as it entails a loss of time. The reason for the conditions last described is, because *Aspergillus oryzæ* fungi need a sufficient supply of oxygen and a large culture surface during growth. These conditions, however, would lead, as an unavoidable consequence, to the mass being infected and contaminated with foreign fungi and bacteria were their growth not temporarily or permanently prevented by the presence of that proportion of antiseptic to which the *Aspergillus oryzæ* fungi have been rendered immune by the acclimatization, claimed generically in said application No. 541617 and specifically herein. Attempts heretofore made to prevent the growth of such foreign fungi, such as the filtering of the air entering the incubator, have failed. This failure is in part due to the practical necessity of opening the chamber and also of use of utensils which it is impossible to keep clean. As some of the antiseptics which may be substituted for formaldehyde, I may mention hydrofluoric, benzoic or salicylic acid. By this acclimatization the spores may be made immune to hydrofluoric acid in the proportion of 1 to 2000 by weight of the moist culture medium and to benzoic or salicylic acid in the proportion of 1 to 500. I prefer formaldehyde because it is dissipated from the mass by the time the koji growth is complete, by partial volatilization and also because of its combining power with protein matters in which combinations it has partially lost its antagonism to the growth of koji.

In place of the wheat bran, I may substitute comminuted grains of cereals but the bran of cereals I prefer on account of its volume which affords larger surface for the growth of the fungi. I do not, however, limit myself to these substances since I believe that any substance which at the same time presents sufficient surface and affords sufficient nutriment for the fungi may be employed as the culture medium, such as dried distiller's or brewer's slop, etc.

I believe that I am the first one to discover or produce a fungus for enzyms having starch converting (i. e. converting starch into sugar) power and at the same time substantially immune from the action of a proportion of antiseptic incompatible with the growth of other fungi or bacteria. I also believe that I am the first one to acclimatize any substance having starch converting power against antiseptic influence.

My new product in any of its forms may be recognized by possession of the following characteristics in combination, namely: It possesses diastatic power and when tested in comparison with ordinary fungus of the same species it displays an abnormal resistance against the influence of an antiseptic, such as formaldehyde.

My new culture of diastatic fungi has the strength of converting from ten to twenty times its weight of starch within about one hour; the weight of the culture being taken dry. One hour or less is the time usually taken for the saccharification and transfer to a different tub in the fermentation industry.

Having thus described my invention, I claim as new:

1. As an article of manufacture, a koji characterized by the possession of diastatic power combined with an abnormal resistance to antiseptic power.

2. As an article of manufacture, a koji characterized by power of producing enzyms having starch converting ability and of a strength capable of converting at least ten times its weight of starch within about one hour.

3. As an article of manufacture, a koji possessing high resistance to antiseptic power substantially free from fungi or bacteria possessing comparatively low resistance to antiseptic power.

In testimony whereof, I have hereunto signed my name in the presence of two subscribing witnesses.

JOKICHI TAKAMINE.

Witnesses:
  KIZO WOOYMAKA,
  TOKICHI FUKUI.